(12) United States Patent
Garmer et al.

(10) Patent No.: US 7,256,401 B2
(45) Date of Patent: Aug. 14, 2007

(54) SYSTEM AND METHOD FOR FIRE DETECTION

(75) Inventors: William R. Garmer, San Diego, CA (US); Jonathan M. Luck, El Cajon, CA (US)

(73) Assignee: Ambient Control Systems, Inc., El Cajon, CA (US)

( * ) Notice: Subject to any disclaimer, the term of this patent is extended or adjusted under 35 U.S.C. 154(b) by 282 days.

(21) Appl. No.: 10/898,695

(22) Filed: Jul. 23, 2004

(65) Prior Publication Data

US 2005/0001729 A1    Jan. 6, 2005

Related U.S. Application Data

(63) Continuation-in-part of application No. 10/492,155, filed as application No. PCT/US02/32242 on Oct. 10, 2002, now Pat. No. 7,154,095.

(60) Provisional application No. 60/328,436, filed on Oct. 10, 2001.

(51) Int. Cl.
*G01J 5/02* (2006.01)
(52) U.S. Cl. .................. 250/347; 250/339.01
(58) Field of Classification Search ............... 250/347, 250/339.01
See application file for complete search history.

(56) References Cited

U.S. PATENT DOCUMENTS

| | | | |
|---|---|---|---|
| 4,455,487 A * | 6/1984 | Wendt .................... | 250/339.05 |
| 4,471,221 A * | 9/1984 | Middleton et al. ....... | 250/339.15 |
| 4,691,196 A * | 9/1987 | Kern et al. .............. | 340/578 |
| 4,785,292 A * | 11/1988 | Kern et al. .............. | 340/578 |
| 4,800,285 A * | 1/1989 | Akiba et al. ............. | 250/554 |
| 4,982,176 A | 1/1991 | Schwarz | |
| 5,162,658 A | 11/1992 | Turner et al. | |
| 5,229,649 A | 7/1993 | Nielsen et al. | |
| 5,592,151 A * | 1/1997 | Rolih ..................... | 340/584 |
| 5,661,349 A | 8/1997 | Luck | |
| 5,693,943 A * | 12/1997 | Tchernihovski et al. .... | 250/342 |
| 5,726,451 A | 3/1998 | Ishida et al. | |
| 5,777,548 A * | 7/1998 | Murakami et al. ......... | 340/506 |
| 7,129,493 B2 * | 10/2006 | Garmer et al. ............ | 250/347 |
| 7,154,095 B2 * | 12/2006 | Luck et al. .............. | 250/347 |
| 2004/0183021 A1 * | 9/2004 | Luck et al. .............. | 250/347 |
| 2005/0001167 A1 * | 1/2005 | Garmer et al. ........... | 250/347 |

FOREIGN PATENT DOCUMENTS

| | | |
|---|---|---|
| DE | 199 54 259 A 1 | 5/2001 |
| JP | 07015230 A | 1/1995 |
| JP | 2000165128 A | 6/2000 |
| JP | 2001267836 A | 9/2001 |
| JP | 2001320224 A | 11/2001 |

* cited by examiner

*Primary Examiner*—David Porta
*Assistant Examiner*—David S. Baker
(74) *Attorney, Agent, or Firm*—Crowell & Moring

(57) ABSTRACT

A system and method for detecting radiation indicative of fire, such as forest fire. In one embodiment, a threshold energy level is determined based on ambient sensor conditions. A sensor unit may be setup to scan a predetermined area for electromagnetic radiation. Any detected electromagnetic radiation may then be band pass filtered to a wavelength range centered about a predetermined frequency associated with the presence of fire. The resulting energy level signal may then be further filter to pass only those signals which exhibit a "flicker" frequency. If the resulting filtered signal exceeds the threshold signal, a fire notification signal may then be generated.

24 Claims, 8 Drawing Sheets

SYSTEM AND METHOD FOR FIRE DETECTION

CROSS REFERENCE TO RELATED APPLICATION

This application is a continuation-in-part of U.S. application Ser. No. 10/492,155, filed Apr. 9, 2004 now U.S. Pat. No. 7,154,095, which based upon PCT International Application No. PCT/US02/32242, filed Oct. 10, 2002, which claims the benefit of U.S. Provisional Application Ser. No. 60/328,436, filed Oct. 10, 2001.

BACKGROUND OF THE INVENTION

1. Field of the Invention

The invention relates generally to the detection of radiation energy, and more particularly to the use of radiation sensitive sensors to detect physical phenomenon such as emergent forest fires.

2. Description of Related Art

With cities around the world becoming more severely congested and polluted, compounded by the high cost of living in urban areas, increasing numbers of the population are moving into the Wildland Urban Interface (WUI) —those areas where forest and grasslands border residential development. The appeal of a rural setting and the privacy of a larger parcel of land provide an idyllic environment for many families.

However, as more families move into the WUI, there are an increased number of shared boundaries between population and wildland areas. This has resulted in an increased risk of wildfire that endangers structures and lives. This is due in part to more human activity near wildland areas which increases the chance of fire from human; carelessness or unavoidable accidents; fires started by natural causes, such as lightning; and aesthetic landscape preferences often place decorative, fuel rich trees and bushes in close proximity to structures.

Wildland firefighters were originally trained in conventional methods and practices of dealing with wildfires in which there were minimal structures and human habitation. However, much of the development in the WUI has been oriented toward the aesthetics of living in a forested area, and has not incorporated fire safety features in the design of the roads, water systems, structures or landscaping. For example, in order to preserve the natural environment, road systems leading to the homes are often narrow and present difficult access challenges for multiple large, public safety vehicles in the event of an emergency. In view of these circumstances, there is increased reliance on homeowners to take more responsibility for their personal safety and for the protection of their homes.

The changing role and level of risk of the firefighter in the growing WUI necessitates a rethinking of responsibilities for safety. The current trend is for the homeowner to take more responsibility for their safety by incorporating a defensible space around their dwellings. This includes using landscaping that reduces fire risk by virtue of its location as well its level of fire resistance.

Increasing homeowner responsibility also necessitates incorporating means for detecting and suppressing fires quickly when they occur. There are a number of gels and foam products that retard fires and can prevent them from burning down structures when applied properly. There are many substantiated instances in which a properly foamed or gelled home escaped being burned by a voracious wildfire as it moved through the WUI. However, successful protection of a structure in a wildfire, regardless of the suppression technique employed, requires proper advanced notice and preparation. In the case of unoccupied homes, such vacation homes, there are presently no effective means for providing the necessary advanced notification of a proximate wildfire. Thus, there is a need for a system and method of providing the detection of a wildfires which avoids the aforementioned problems.

SUMMARY OF THE INVENTION

Disclosed and claimed herein are systems and methods for fire detection. In one embodiment, a method includes receiving electromagnetic radiation from an energy source, filtering the electromagnetic radiation to a wavelength range centered about a predetermined frequency associated with the presence of fire, and generating an energy level signal based on the received electromagnetic radiation. The method further includes filtering the energy level signal to a flicker frequency range indicative of fire and comparing a magnitude of the energy level signal to a threshold value. In one embodiment, if the energy level signal is greater than the threshold value, a fire notification signal is generated.

Other aspects, features, and techniques of the invention will be apparent to one skilled in the relevant art in view of the following detailed description of the invention.

DETAILED DESCRIPTION OF EXEMPLARY EMBODIMENTS

Figure 1:
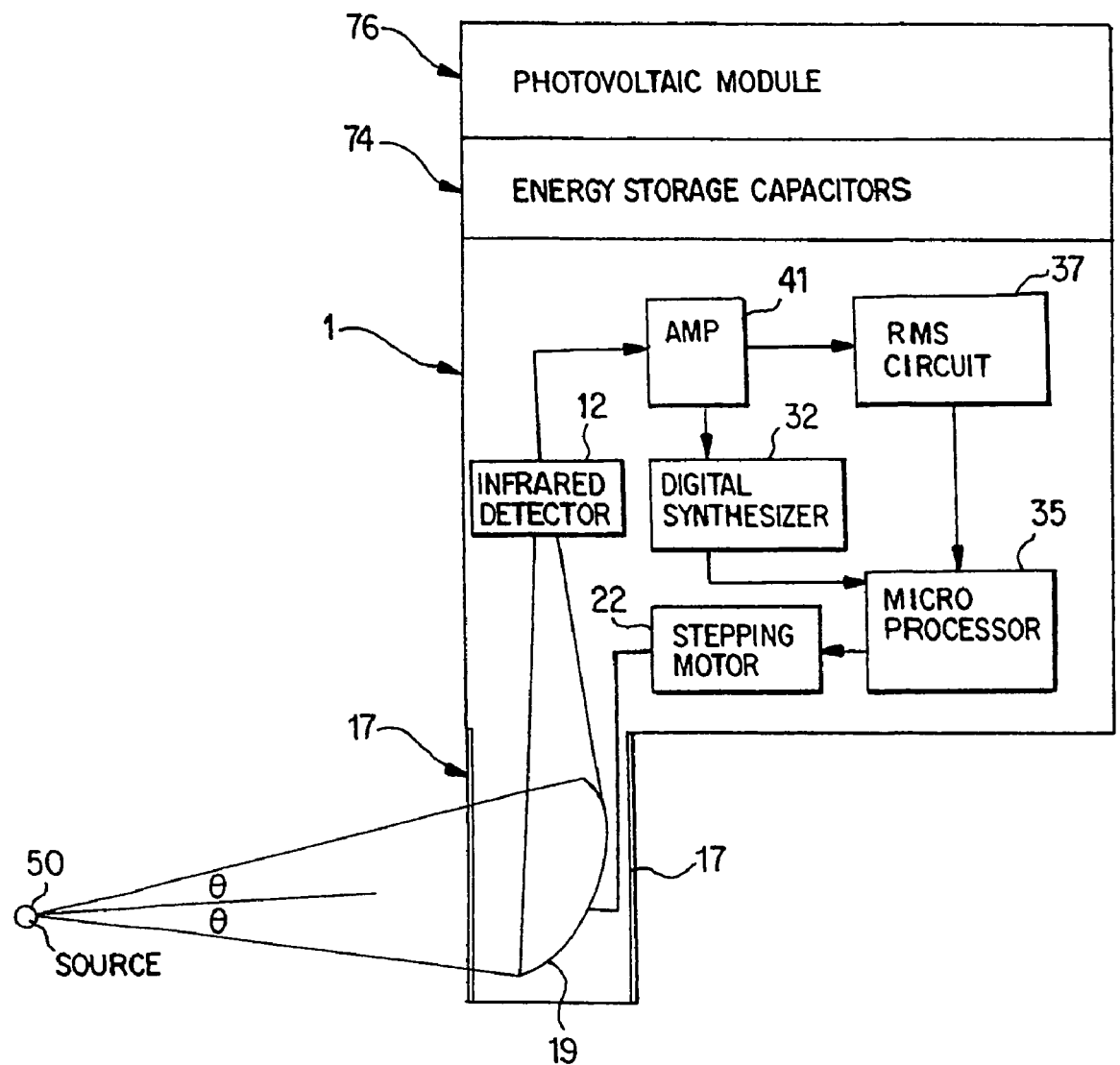
FIG. 1 is a function diagram of one embodiment of a sensor unit which implements one or more aspects of the invention.

One aspect of the present invention is to provide a system and method for detecting radiation indicative of fire, such as forest fire. In one embodiment, a threshold energy level is determined based on ambient sensor conditions. In one embodiment, the threshold level may be dynamically adjusted, or alternatively may be static.

In one embodiment, a sensor unit is setup to scan a predetermined area for electromagnetic radiation. Any detected electromagnetic radiation may then be band pass filtered to a wavelength range centered about a predetermined frequency associated with the presence of fire, which in one embodiment is 4.3 microns in the infrared spectrum. The resulting energy level signal may then be further filter to pass only those signals which exhibit a "flicker" frequency. In one embodiment, this flicker frequency is indicative of fire and ranges between 1 and 10 Hertz.

In another embodiment, or in addition to any of the previous embodiments, the magnitude of any detected energy level signal may be compared to the predetermined threshold value. If the energy level signal exceeds the threshold value, a notification signal indicating the presence of fire may be generated. In one embodiment, the notification signal may also include location information since the infrared sensor may report its bearing at the time the threshold value was exceeded.

Another aspect of the invention is to provide a reliable technique for the detection of fire which minimizes the occurrence of false positive readings. In one embodiment, this may be done by causing the infrared sensor to sweep in a circular 360 degrees path, while pausing on each of a series of bearings to take energy measurements. While each bearing can be any size, in one embodiment each bearing spans approximately 6 degrees. While paused at each bearing, a number of energy samples may be taken by the sensor. Using these energy samples, an energy value for each bearings can then be computed, which in one embodiment is done using root mean square analysis. These energy values can then be compared to the threshold value. If the energy value for a given bearing exceeds the threshold value a predetermined number of times, the sensor unit may then enter a detect mode in which the bearing in question can be further analyzed.

In one embodiment, while in the detect mode, the sensor unit takes additional energy samples for the bearing in question over a longer period of time. After these additional energy samples have been normalized, they may be compared against threshold value. If the threshold value is again exceeded, a fire notification signal may be generated.

As mentioned above, the detection of a large $CO_2$ signal at 4.3 micrometers is suggestive of a fire. However, in order to distinguish spurious signals from 4.3 micrometer radiation of the type which may be due to sun reflection or radiation emissions from heated $CO_2$ not arising from an incipient forest fire, in one embodiment it may be helpful to detect whether the 4.3 micrometer signal has a "flicker" frequency indicative of fire. In one embodiment, this "flicker" frequency is between 1 and 10 hertz. Additionally, a signal strength analysis (e.g., a Root Mean Square analysis) of the output of the detector 12 may be used to provide for an initial determination of whether a fire has been detected.

Still further discrimination may be necessary to determine whether the fire is a forest fire, a campfire or a hiker mischievously holding a lit cigarette lighter in front of the radiation sensor. In one embodiment, this additional discrimination is based on a digital frequency analysis of the output of the IR detector. Both of these methods of discrimination may be taken into consideration during the scanning by the stepper motor 22 under the control of the microprocessor 35, as will be further described below.

Figure 5:
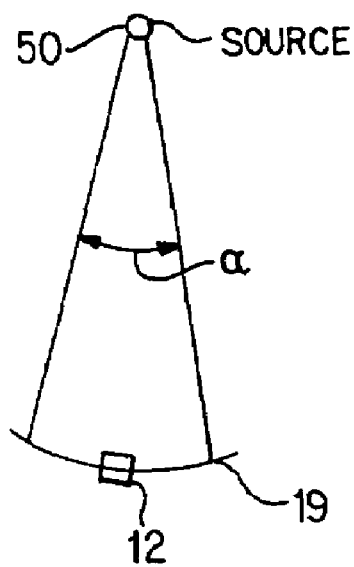
FIG. 5 is a sketch of a top view of FIG. 1 illustrating one embodiment of rotation in the horizontal plane.

Via the scanning mechanism, the sensor signals from detector 12 for each bearing may be smoothed by averaging, creating a background baseline reference. In one embodiment, each bearing is comprised of a six-degree increment. As shown in FIG. 5, each step of the mirror covers an angle α in the horizontal direction. With each subsequent step, an additional bearing (e.g., six degrees) is covered, until a full 360° circle is accomplished. During each step the output of detector 12 may be amplified and analyzed by microprocessor 35 after being processed by the RMS circuit 37. In another embodiment, before the scanning process can begin, the sensor unit 1 is initialized. One embodiment of this initialization process will now be described with reference to FIG. 6.

1. System Overview

The sensor system 1 of FIG. 1 illustrate one embodiment of a microprocessor-based sensor system which may be used to implement one or more aspects of the invention. The sensor system 1 of FIG. 1 is depicted as having a single infrared radiation (IR) detector 12 receiving radiation from source 50 passing through sapphire window 17 and reflected by rotatable mirror 19. In one embodiment, the mirror 19 provides 360° rotation in increments of 6 degrees, for example, by control of the stepping motor 22. The vertical angle 2θ may have a magnitude determined by the sapphire window 17 and the vertical distance covered by the length of mirror 19. In one embodiment, 2θ covers approximately 90 degrees which, when sensor system 1 is positioned in the forest environment, may be ±45 degrees from the horizontal.

For determining fire, radiation may be detected in a narrow frequency band with a band pass centered at approximately 4.3 micrometers in the infrared spectrum (IR). In one embodiment, the sensor system 1 provides this narrow band sensitivity by using a detector 12 having a silicon window covered with two separate optical coatings. Each coating may have a separate but overlapping pass band. Additionally, there may be a separate sapphire window which itself has a radiation pass band. As will be described in more detail below, the basis for detection of a fire is the emission of the $CO_2$ at 4.3 micrometers while normal atmospheric $CO_2$ is absorptive at this particular wavelength. That is, solar radiation at 4.3 micrometers is almost completely absorbed by the Earth's atmosphere. Therefore, detection of a large signal at 4.3 micrometers is suggestive of a fire.

Figure 2:
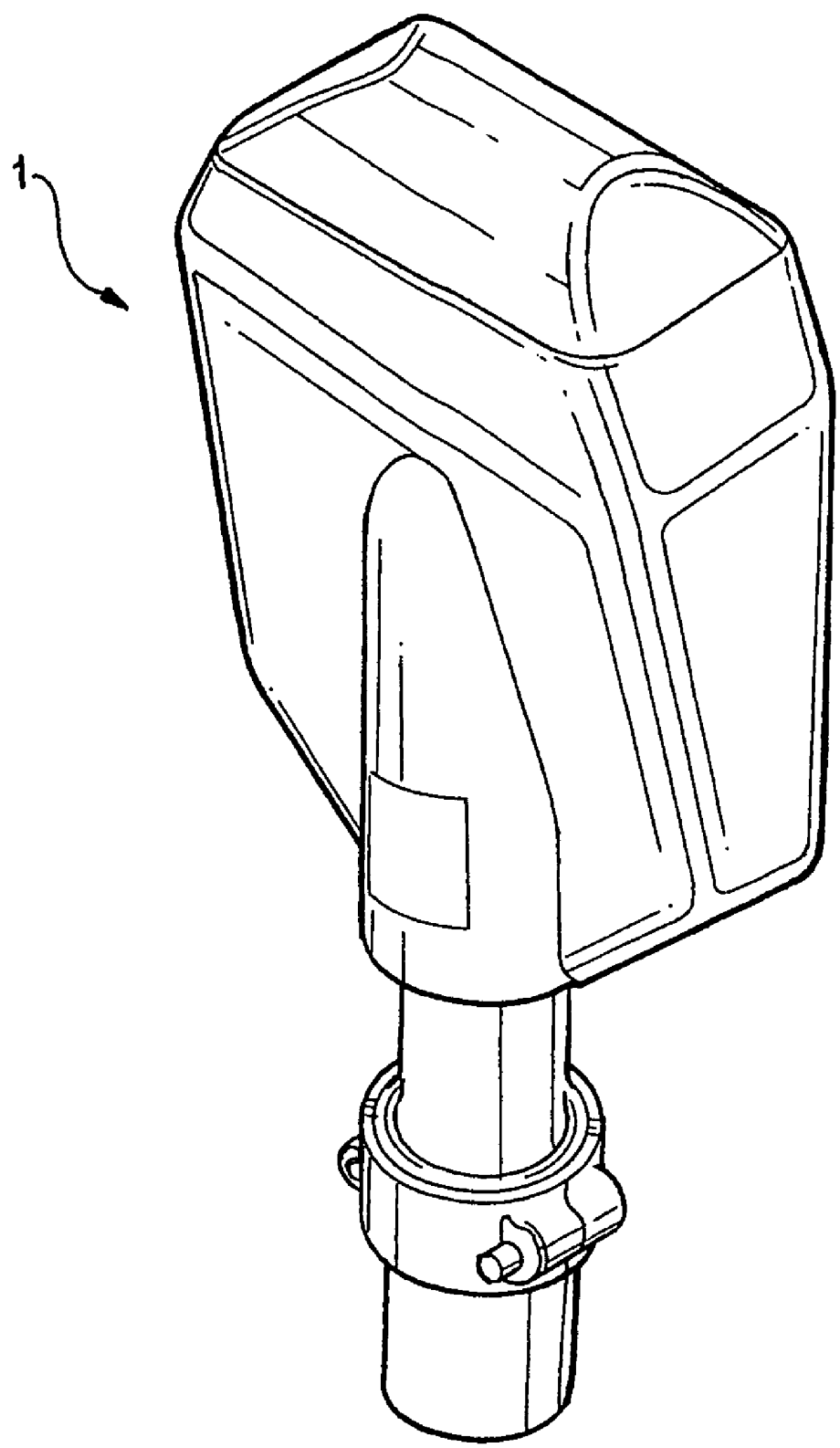
FIG. 2 depicts one embodiment of the exterior of a unit constructed in accordance with FIG. 1.
Figure 3:
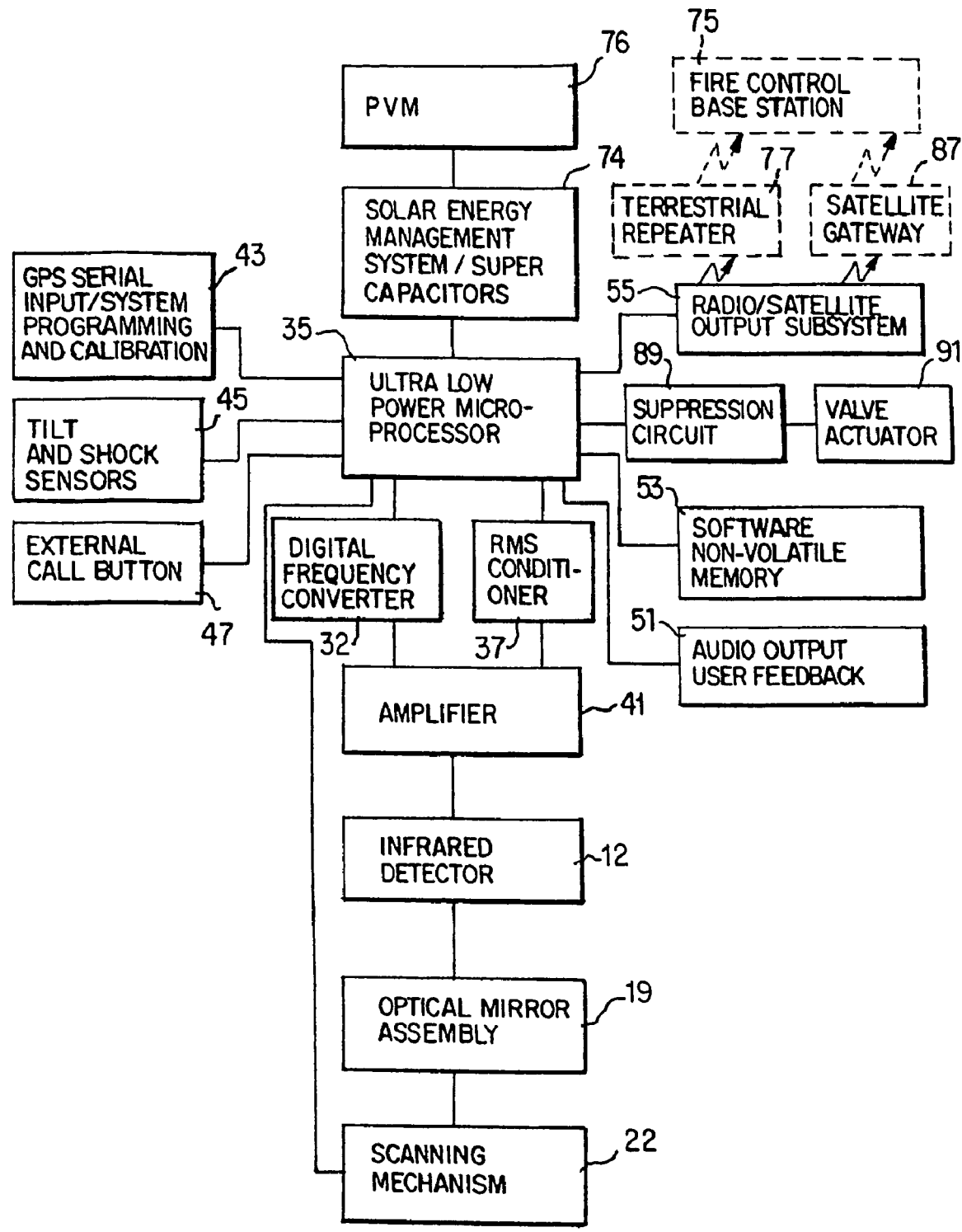
FIG. 3 is a block diagram functionally describing one embodiment of the sensor unit of FIG. 1.

FIG. 2 depicts one embodiment of the exterior of a unit constructed in accordance with FIG. 1. Conversely, FIG. 3 illustrates one embodiment of the various internal structural components of a system within the sensor system 1 of FIG. 1. In addition to the scanning mechanism 22, the infrared detector 12, the analog amplifier 41, the root mean square (RMS) conditioning circuit 37 and the digital frequency converting circuit 32, a solar energy management system 57 functions, for example, in accordance with the energy management system of the above-described U.S. Pat. No. 5,229,649. Output signals from the sensor system 1 are sent out through the radio/satellite modem output subsystem 55 to the fire control base station 75 terrestrially through a radio repeater 77 or by way of a satellite to a satellite gateway 87.

The location of the sensor system 1 is determined based upon the GPS location information programmed into the system. In another variation, the sensor system 1 can include an external call button 47 which can be depressed by a human to cause a radio signal to be sent. The system would then serve as a "call box" for injured or last hikers, woodsmen, and or others such as fireman in trouble who may have occasion to require aid or make other approved or prearranged signals to a central location. Additionally, the fire system sensor can be set up so that it is normally put into an alarm mode based on vandalism or tilt event. The tilt and shock sensors 45 provide the mechanisms for such an alarm system.

In addition to providing notification of forest fires, the system is equally adaptable at providing indications of fires within confined or specific areas by an alarm actuation as well as actuation of a suppression system such as water sprinkler system, a gel system or a foam system. Because of the above described scanning function accomplished by the signal fixed element which continues to scan after an initial detection of fire, the system is able to not only indicate the beginning of a fire, but also when a fire ceases to exist. This can be particularly useful with respect to a water sprinkler system which, in the prior art, continues to operate until a shut-off is manually performed, sometimes many hours after the fire has occurred. In most environments, when a fire occurs and a sprinkler system is set off, the major damage is due to water caused by the continuous sprinkler operation. Using this detector, with its ability to continue scanning after the beginning of a fire, allows for not only the output of the signal to initiate the water sprinkler system, a foam system or a gel system but also to shut off the suppression system when the fire is extinguished.

This system allows for the control of a two-way valve to facilitate control of a sprinkler/foam/gel system. The control of the two way valve is affected through an electromechanically actuated latching solenoid that is controlled by signals from sensor system 1. The system may be wired directly to the sprinkler actuator or it may be set up for remote operation. It is also an advantage of this system that the sensor continues to scan even after a fire is extinguished so that, a sprinkler system, foam system or gel system can be reactivated if the fire reoccurs. Additionally, the ability to shut off the foam/gel system allows for saving foam/gel because such systems have a limited storage capacity.

Figure 4:
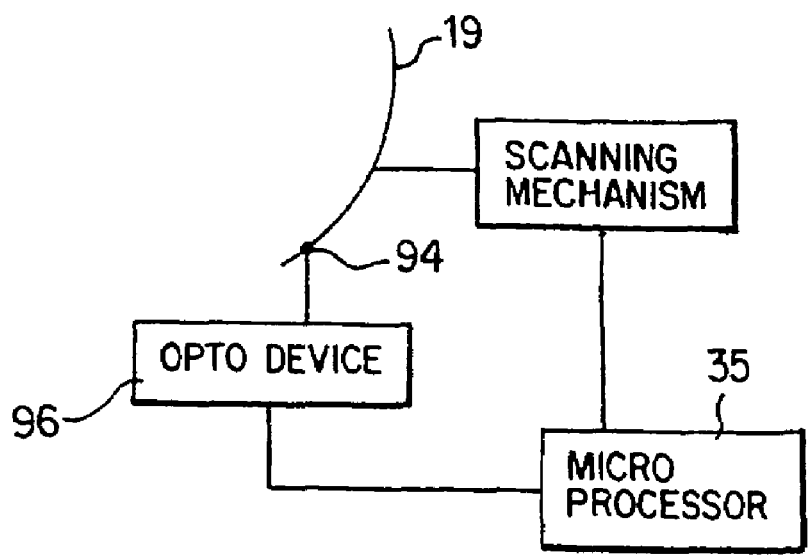
FIG. 4 schematically illustrates one embodiment of directional calibration of the sensor unit of FIG. 1.

Orientation calibration of the sensor can be accomplished, for example, using the opto device 96 shown in FIG. 4 in association with the mirror 19. The opto device 96 include an optical sensor which directs light toward the spot 94 and receives the reflected light. This spot 94 may be made of gold or some other material providing precise reflection to the opto device. The opto device 96 is used to calibrate the mirrors rotational position and provides such information to the microprocessor 35. Alignment to magnet north can now occur by rotating the mirror an additional number of steps until the mirror is pointing at magnetic North. This additional number of steps past the calibration point is stored by the microprocessor such that true fire bearing can be sent in an alarm situation. Other forms of self calibration with respect to North may be substituted.

2. Radiation Detection

As mentioned above, the detection of a large $CO_2$ signal at 4.3 micrometers is suggestive of a fire. However, in order to distinguish spurious signals from 4.3 micrometer radiation of the type which may be due to sun reflection or radiation emissions from heated $CO_2$ not arising from an incipient forest fire, in one embodiment it may be helpful to detect whether the 4.3 micrometer signal has a "flicker" frequency indicative of fire. In one embodiment, this "flicker" frequency is between 1 and 10 hertz. Additionally, a signal strength analysis (e.g., a Root Mean Square analysis) of the output of the detector 12 may be used to provide for an initial determination of whether a fire has been detected.

Still further discrimination may be necessary to determine whether the fire is a forest fire, a campfire or a hiker mischievously holding a lit cigarette lighter in front of the radiation sensor. In one embodiment, this additional discrimination is based on a digital frequency analysis of the output of the IR detector. Both of these methods of discrimination may be taken into consideration during the scanning by the stepper motor 22 under the control of the microprocessor 35, as will be further described below.

Via the scanning mechanism, the sensor signals from detector 12 for each bearing may be smoothed by averaging, creating a background baseline reference. In one embodiment, each bearing is comprised of a six-degree increment. As shown in FIG. 5, each step of the mirror covers an angle α in the horizontal direction. With each subsequent step, an additional bearing (e.g., six degrees) is covered, until a full 360° circle is accomplished. During each step the output of detector 12 may be amplified and analyzed by microprocessor 35 after being processed by the RMS circuit 37. In another embodiment, before the scanning process can begin, the sensor unit 1 is initialized. One embodiment of this initialization process will now be described with reference to FIG. 6.

Figure 6A:
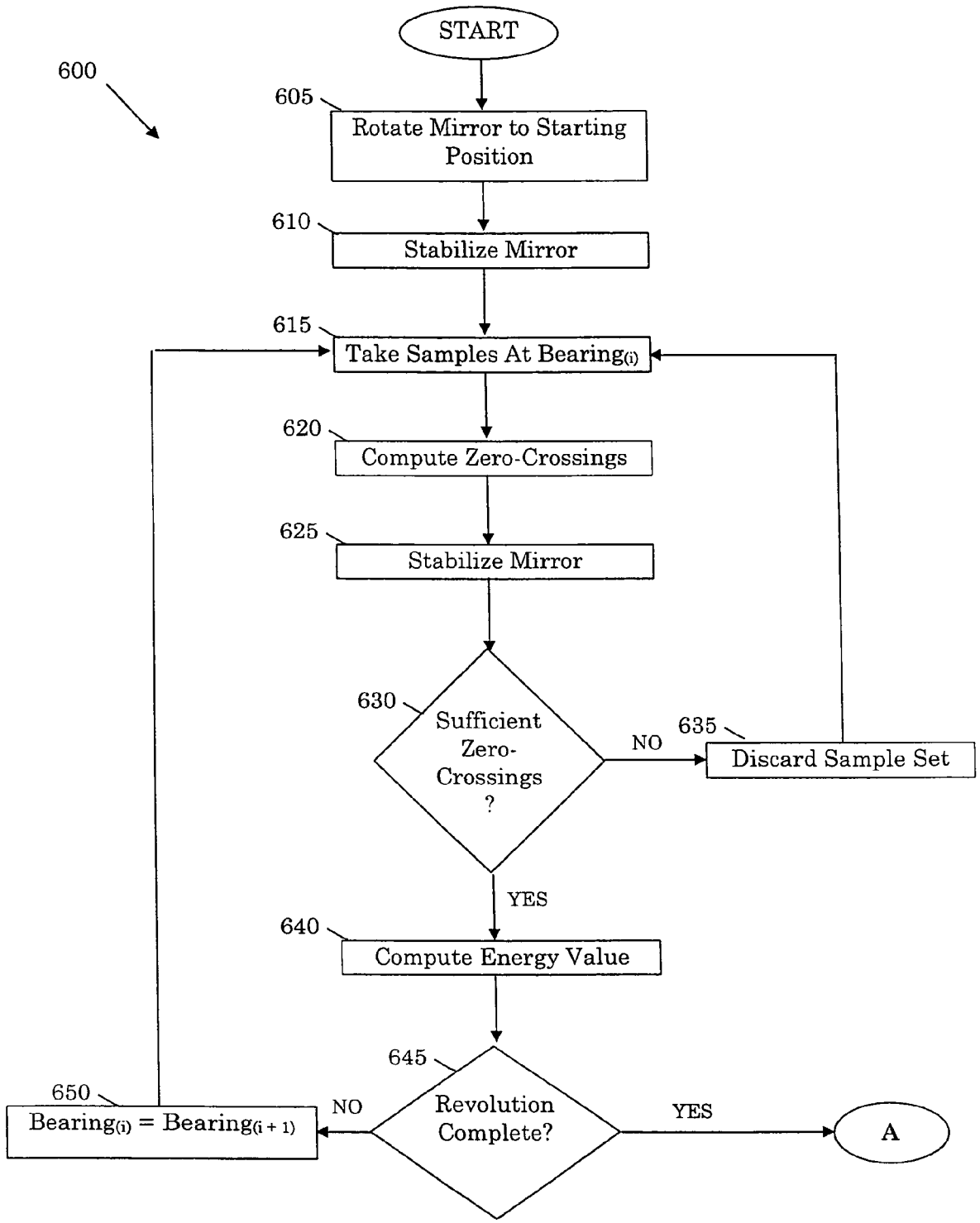
FIGS. 6A-6B illustrate a flow diagram of an exemplary process for initializing a detection system, consistent with the principles of the invention.

FIG. 6A is one embodiment of the initialization process 600 for sensor unit 1. Process 600 begins at block 605 with the rotation of mirror 19 to a starting position or bearing, which in one embodiment can be denoted as bearing$_{(i)}$, where i=1. As previously mentioned, in one embodiment stepping motor 22, under the control of microprocessor 35, can be used to rotate the mirror 19. Once the mirror is positioned at the starting bearing, microprocessor 35 may wait for a predetermined delay period to allow the mirror 19 to stabilize (block 610). While in one embodiment, this delay may be 1 second, it should equally be appreciated that the delay may be more or less, and may be dependent on the final system design.

After the mirror has stabilized, at block 615 the microprocessor 35 may then take a series of signal samples over the course of sample period, which in one embodiment is 1 second. These output samples may then be fed through amplifier 41 to the RMS conditioner 37 under the control of the microprocessor 35. In one embodiment, the amplifier 41 is a low-frequency amplifier having a passband between approximately 1 and 10 Hertz—the frequencies indicative of fire. The amplifier 41 is a low frequency amplifier having a passband between approximately 1 and 10 Hertz. While the sample rate is a design consideration impacted by many factors, including the speed of microprocessor 35, in one embodiment 192 samples may be taken during the sample period.

While the microprocessor 35 may fix the sample period to be 1 second as mentioned above, actual detection may only take place after a "settling in" period. That is, sample period may be divided up into a "settling in" period and a "detection" period. To that end, in one embodiment every sample period may contain an approximately 0.3 second segment during which the new position is "settled in" in order for the received infrared signal through the sapphire window to the detector to adjust to the particular level. The requisite RMS analysis may then be performed over the remaining approximately 0.7 seconds before moving to the next bearing. It should equally be appreciated that numerous other analytical approaches (other than RMS) may similarly be used to assign a value to the received energy.

Process 600 continues to block 620 where the samples are processed by the microprocessor 35 to compute the number of times the signal transitions from above the mean value of the sample set to below the mean value. This number, referred to as the "zero-crossing" number, is a measure of whether the signal is "flickering," as it would in case of a fire. A determination may then be made at decision block 630 as to whether a sufficient number of zero-crossings were recorded. If an insufficient number of zero-crossings are found, then process 600 moves to block 635 where the sample set is discarded and a new set is computed. If, on the other hand, there are a sufficient number of zero-crossings, then process 600 continues to block 640 where an energy value may be computed for the bearing in question. In one embodiment, this energy value, or "chip" value, is a measure of the magnitude of the received energy. The received energy level can be computed from the sample sets in a number of different ways depending on a myriad of factors, including the complexity of the microprocessor 35. In one embodiment, the sum of the absolute values of the samples may be used. Alternatively, computing the true RMS value may be used when the microprocessor 35 is able to provide sufficient computing power.

At this point, a determination is made as to whether the stepping motor 22 has caused the mirror 19 to complete a full revolution. If not, then at block 650, the mirror 19 is incremented to the next bearing from which a new set of samples may then be taken, If, on the other hand, the mirror 19 has completed a full revolution, then the initialization process 600 continues to FIG. 6B.

Figure 6B:
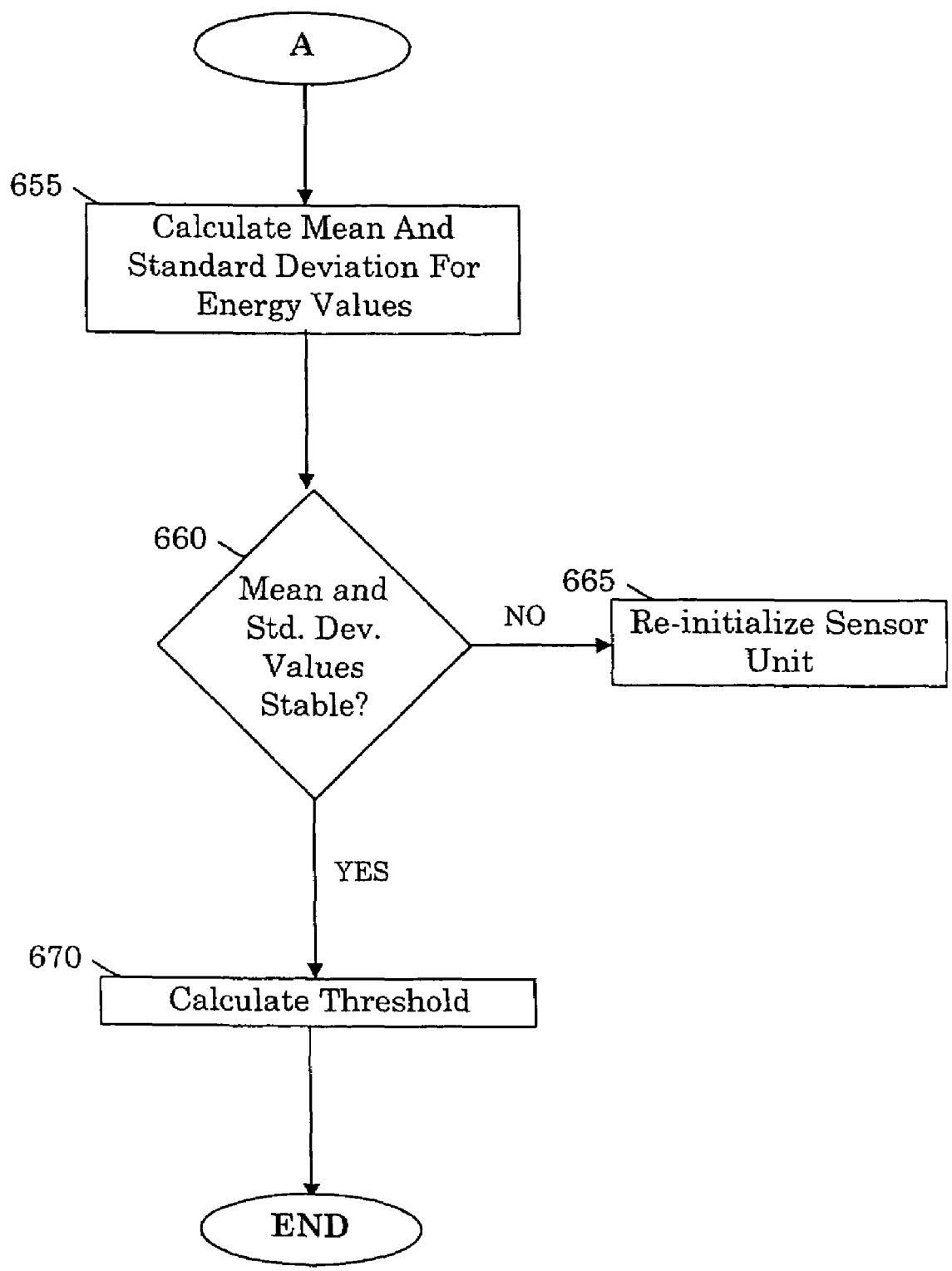

Process 600 continues with block 655 of FIG. 6B. After completing a revolution, the collected set of energy values for that revolution may then be processed to determine the mean and standard deviation values (block 655). If the mean and standard deviation are determined to be stable, process 600 continues to block 670 where a threshold value may then be computed. If, on the other hand, the mean and standard deviation vales are not stable, then the energy values may be discarded and the initialization process 600 restarted.

The initialization process 600 culminates with the computation of a threshold value at block 670. In one embodiment, the threshold value is computed according to the formula:

$$\text{Threshold}=EV_{Mean}+(\gamma \cdot EV_{SD}), \quad (1)$$

where, $EV_{Mean}$=the mean of the sampled energy values for a complete revolution;

$EV_{SD}$=the standard deviation of the sampled energy values for a complete revolution; and, $\gamma=Q^{-1}$(Desire False Alarm Rate), where $Q^{-1}$ is the inverse Q function.

It should of course be understood that other formulations may be used to determine the threshold value. For example, in one embodiment the microprocessor 35 may have an associated memory (not shown) with stored characteristics of forest fires, which may serve as the predefined criteria of flicker frequency analysis.

Figure 7:
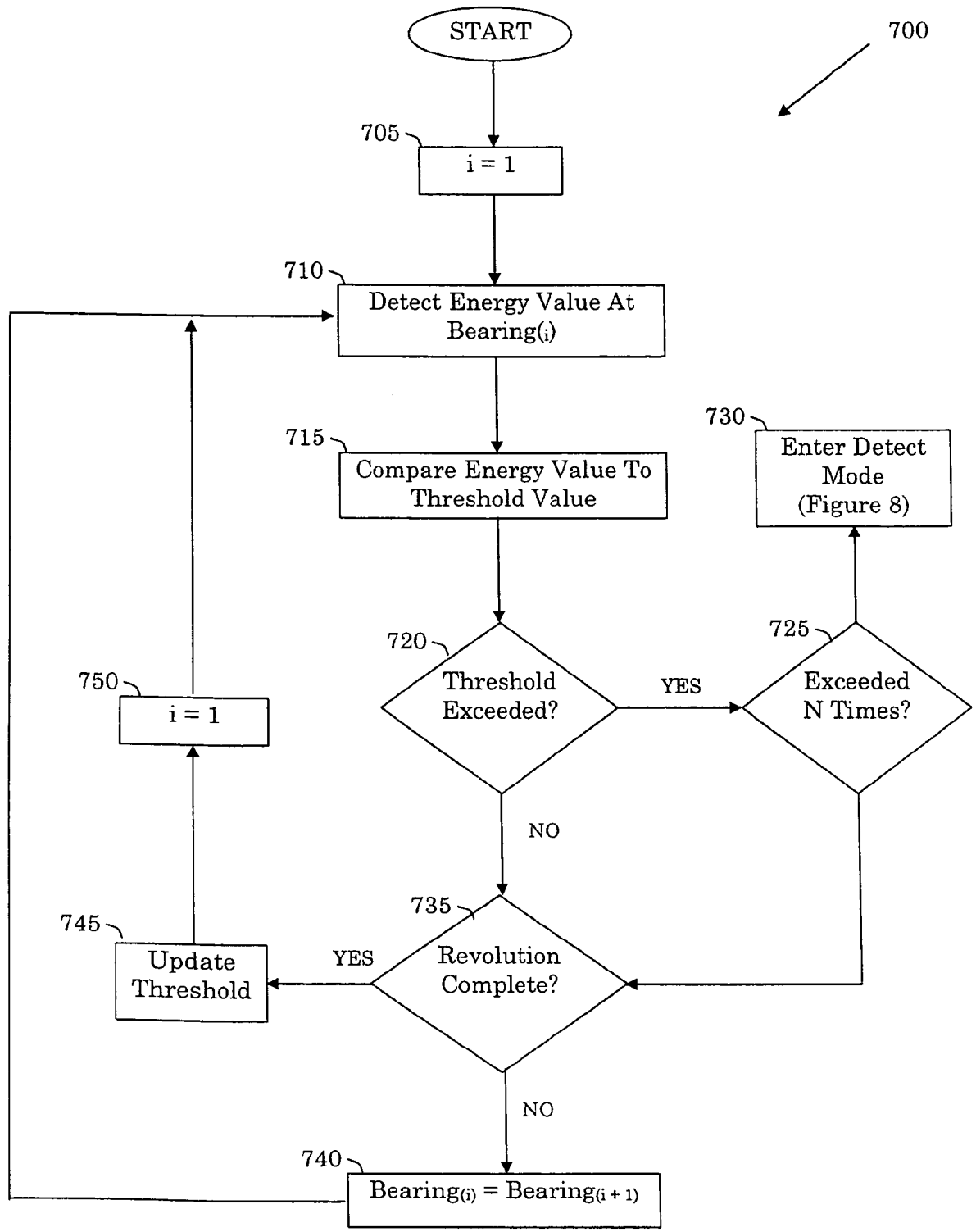
FIG. 7 is one embodiment of flow diagram for carrying out radiation detection operations, consistent with the principles of the invention.

Once Process 600 is complete and the threshold value has been computed, the sensor unit 1 may begin to operate in a normal scan mode. Process 700 of FIG. 7 illustrates one embodiment of how sensor unit 1 may operate in scan mode. In particular, process 700 begins with the microprocessor 35 rotating the mirror 19 through each bearing and computing the received (chip) energy level beginning at bearing$_{(i)}$, where i=1. As previously mentioned, the detection of a $CO_2$ signal at 4.3 micrometers is suggestive of a fire. Thus, energy level samples of a 4.3 micrometers having "flicker" frequencies of between 1 and 10 hertz can be effectively used to detect fire.

Each bearing energy value may be compared to a threshold value at block 715. In one embodiment, the threshold value is the value calculated according to Formula 1. If the current bearing provides an RMS indication of $CO_2$ which exceeds the predetermined threshold value, process 700 moves to block 725, where a determination is made as to whether the detected energy value for bearing$_{(i)}$ has exceeded the threshold value a predetermined number of time (N). While in one embodiment N=2, it should similarly be appreciated that N greater or less than 2. If the threshold value has been exceeded more than N times for a given bearing, process 700 will move to block 730 at which point the sensor unit 1 may enter a detect mode. In one embodiment, exceeding the threshold value N times is a possible indication of fire which requires additional analysis. The sensor unit's detect mode will be discussed in detail below with reference to FIG. 8.

If, at block 720, it is determined that the energy value for bearing$_{(i)}$ did not exceed the threshold value, then process 700 will continue to decision block 735. Similarly, if it is determined at block 725 that the energy value for bearing(i) has not exceeded the threshold value N times, then process 700 will also move to block 735.

At decision block 735, a determination is made as to whether the mirror 19 has completed one complete revolution. If not, process 700 will increment the mirror to the next bearing at block 740 and repeat the energy value detection operation of block 710 for the current bearing. If, on the other hand, a full revolution has been completed, then process 700 moves to block 745 where the previously calculated threshold value may be updated. In one embodiment, energy values for all of the bearings in a revolution may be retained, except for those bearings which exceeded the threshold value. At the end of the revolution, the mean and standard deviation of those energy values may then be computed (see block 655 of FIG. 6B). In one embodiment, this information may be combined with the previously calculated mean and standard deviation values to generate revised $EV_{Mean}$ and $EV_{SD}$ values. In one embodiment, this combination operation may be performed in an Infinite Impulse Response (IIR) filter. Regardless of how they are computed, once the revised $EV_{Mean}$ and $EV_{SD}$ values have been generated, a revised threshold value may then be computed (block 745), which in one embodiment may be done using Formula 1. The sensor unit 1 may then repeat the scan process 700 using this revised threshold value.

Figure 8:
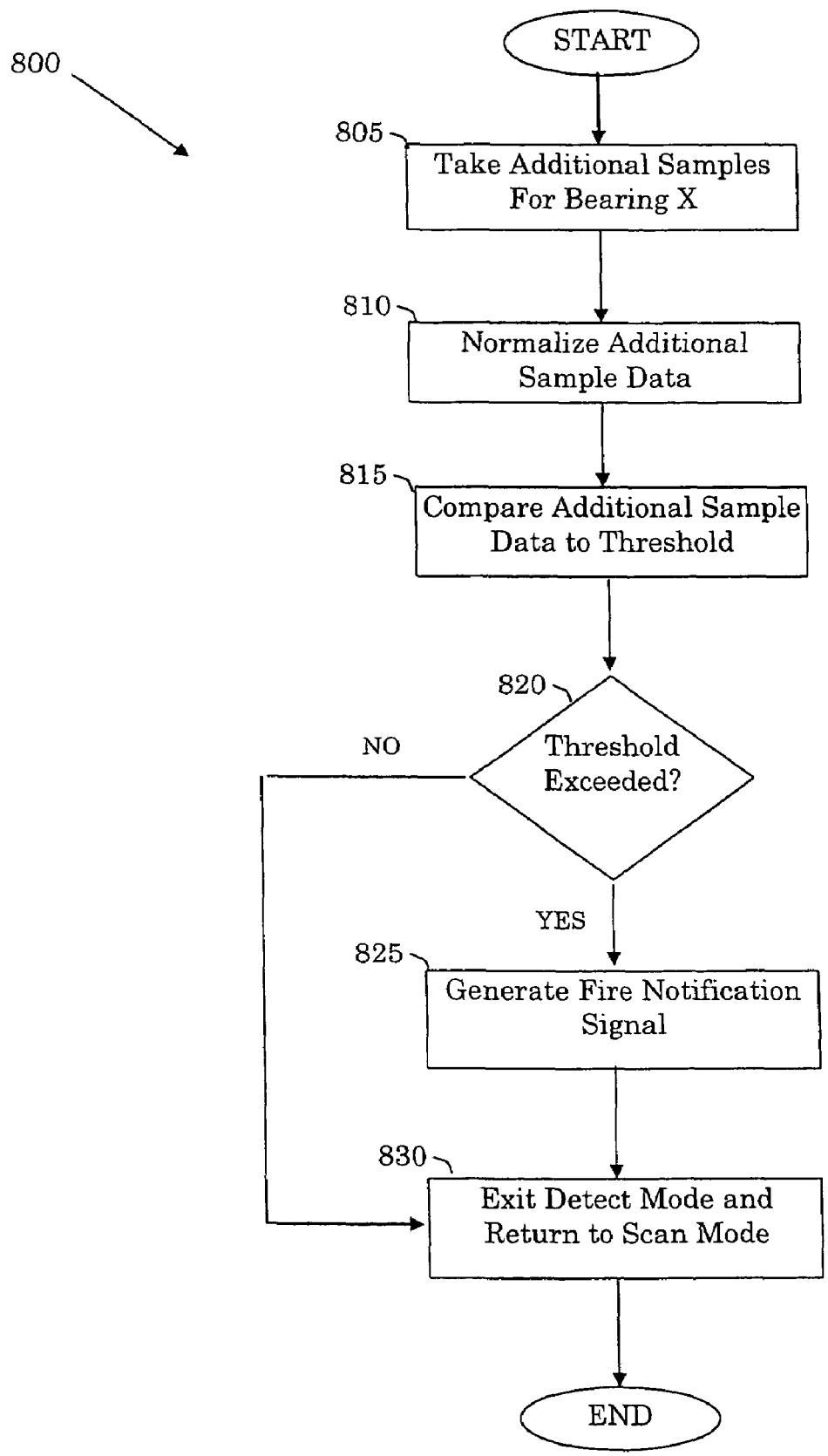
FIG. 8 is another embodiment of flow diagram for carrying out radiation detection operations, consistent with the principles of the invention.

FIG. 8 depicts one embodiment of the sensor unit's detect mode. As mentioned above, in one embodiment the sensor unit 1 may enter detect mode after a given bearing (referred to hereafter as "bearing X") exceeds the threshold value N times. In the embodiment of FIG. 8, detect process 800 begins with the sensor unit 1 taking additional samples at block 805 for bearing X. To do this, the mirror 19 may remain fixed on the bearing to be analyzed for a period of time beyond the regular sample period (e.g., 1 second). In one embodiment, the mirror 19 may remain fixed on the bearing in question for up to three minutes in order to provide a detailed examination of the radiation entering bearing X.

Once the additional sample data has been collected at block 805, process 800 continues to block 810 where the data is normalized. In one embodiment, this may be done by dividing the total energy received over the detect period by the number of sample periods in a detect period. For example, in the embodiment where the sample period is 1 second and the detect period is 5 second, the energy received over the additional 5-second detect period would be divided by 5 to scale it back to the same range as the 1-second samples collected during the scan mode.

Once the additional data has been normalized, the additional samples may then be compared to the previously-computed threshold value at block 815. If it is determined at block 820 that additional sample data exceeds the threshold level, a fire notification signal may be generated (block 825). In one embodiment, the fire notification signal may include a fire detection signal and a bearing signal, where the bearing signal can be used by firefighting personnel to determine the location of the fire relative to the sensor unit 1. After the fire notification has been sent, the sensor unit 1 may exit the detect mode and return to the scan mode at block 830. In one embodiment, Scanning continues in scan mode when a fire is indicated to allow for analysis of the spread of the fire to different bearings and to enable detection of the direction in which the fire is spreading. Similarly, if at block 820 the additional sample data did not exceed the threshold level, then process 800 would skip the notification operation and move to block 830 where the detect mode may be exited.

While the preceding description has been directed to particular embodiments, it is understood that those skilled in the art may conceive modifications and/or variations to the specific embodiments described herein. It is understood that the description herein is intended to be illustrative only and is not intended to limit the scope of the invention.

The invention claimed is:

1. A method comprising:
   receiving electromagnetic radiation from an energy source;
   filtering said electromagnetic radiation to a wavelength range centered about a predetermined frequency associated with the presence of fire;
   generating an energy level signal based on said received electromagnetic radiation;
   filtering said energy level signal to a flicker frequency range indicative of fire;
   comparing a magnitude of said energy level signal to a dynamically computed threshold value based on ambient infrared energy levels, wherein the threshold value is determined using the formula, $$\text{threshold value} = EV_{Mean} + (\gamma \cdot EV_{SD}),$$

where,
   $EV_{Mean}$=the mean of the plurality of energy samples,
   $EV_{SD}$=the standard deviation of the plurality of energy samples, and,
   $\gamma = Q^{-1} \cdot (\text{Desired False Alarm Rate})$, where $Q^{-1}$ is the inverse probability function; and
   generating a fire notification signal if said energy level signal is greater than said threshold value.

2. The method of claim 1, further comprising
   (a) rotating a mirror of an infrared sensor in a circular path;
   (b) pausing said mirror on each of a plurality of bearings along said circular path, wherein each of said plurality of bearings spans a predetermined number of degrees;
   (c) taking a plurality of energy samples for each of said plurality of bearings using said infrared sensor during said pausing;
   (d) computing an energy value for each of said plurality of bearings based on said plurality of energy samples;
   (e) comparing said energy values for each of said plurality of bearings to said threshold value; and
   (f) repeating (a) and (e) until said energy value for one of said plurality of bearings exceeds the threshold value a predetermined number of times.

3. The method of claim 2, when said energy value for one of said plurality of bearings has exceeded the threshold value the predetermined number of times, the method further comprising:
   taking additional energy samples for said one of said plurality of bearings that exceeded the threshold value the predetermined number of times;
   normalizing said additional energy samples;
   comparing said normalized additional energy samples to the said threshold value; and
   generating said fire notification signal when said normalized additional energy samples exceeds said threshold value.

4. The method of claim 1, wherein said filtering said energy level signal comprises filtering said energy level signal to a flicker frequency range indicative of fire, said frequency range to be between 1 and 10 Hertz.

5. The method of claim 1, wherein said receiving electromagnetic radiation comprises receiving radiation emission from heated carbon dioxide.

6. The method of claim 1, wherein said generating the fire notification signal comprises generating the fire notification signal where said fire notification signal include fire location information.

7. The method of claim 2, wherein said threshold value is dynamically adjusted based on said plurality of energy samples.

8. A system comprising:
   a sensor for receiving electromagnetic radiation from an energy source;
   a first filter coupled to the sensor for filtering said electromagnetic radiation to a wavelength range centered about a predetermined frequency associated with the presence of fire;
   a second filter for filtering an energy level signal to a flicker frequency range indicative of fire; and
   a processor coupled to the sensor to compare a magnitude of said energy level signal to a dynamically computed threshold value based on ambient infrared energy levels, and if said energy level signal is greater than said threshold value, said processor is to generate a fire notification signal, wherein said threshold value is determined using the formula, $$\text{threshold value} = EV_{Mean}`(\gamma \cdot EV_{SD}),$$

where,
   $EV_{Mean}$=the mean of the plurality of energy samples,
   $EV_{SD}$=the standard deviation of the plurality of energy samples, and,
   $\gamma = Q^{-1} \cdot (\text{Desired False Alarm Rate})$, where $Q^{-1}$ is the inverse probability function.

9. The system of claim 8, further comprising processing circuitry coupled to the sensor, said processing circuitry to,
   (a) rotate a mirror of the sensor in a circular path;
   (b) pause said mirror on each of a plurality of bearings along said circular path, wherein each of said plurality of bearings spans a predetermined number of degrees;
   (c) take a plurality of energy samples for each of said plurality of bearings using said sensor during said pausing;
   (d) compute an energy value for each of said plurality of bearings based on said plurality of energy samples;
   (e) compare said energy values for each of said plurality of bearings to said threshold value; and
   (f) repeat (a) and (e) until said energy value for one of said plurality of bearings exceeds the threshold value a predetermined number of times.

10. The system of claim 9, when said energy value for one of said plurality of bearings has exceeded the threshold value the predetermined number of times, the processing circuitry is further to,
    take additional energy samples for said one of said plurality of bearings that exceeded the threshold value the predetermined number of times;
    normalize said additional energy samples;

compare said normalized additional energy samples to the said threshold value; and generate said fire notification signal when said normalized additional energy samples exceeds said threshold value.

11. The system of claim 9, wherein said threshold value is dynamically adjusted based on said plurality of energy samples.

12. The system of claim 8, wherein said flicker frequency range is between 1 and 10 Hertz.

13. The system of claim 8, wherein said electromagnetic radiation comprises radiation emission from heated carbon dioxide.

14. The system of claim 8, wherein said fire notification signal includes fire location information.

15. The system of claim 8 further comprising:
a magnitude computing subsystem configured to compute said magnitude; and
a digital frequency converting subsystem.

16. A computer readable medium having computer readable program code embodied therein, wherein said computer readable program code causes processing circuitry to:
receive electromagnetic radiation from an energy source;
filter said electromagnetic radiation to a wavelength range centered about a predetermined frequency associated with the presence of fire;
generate an energy level signal based on said received electromagnetic radiation;
filter said energy level signal to a flicker frequency range indicative of fire;
compare a magnitude of said energy level signal to a dynamically computed threshold value based on ambient infrared energy levels, wherein said threshold value is determined using the formula, $$\text{threshold value} = EV_{Mean} + (\gamma \cdot EV_{SD}),$$

where
$EV_{Mean}$=the mean of the plurality of energy samples,
$EV_{SD}$=the standard deviation of the plurality of energy samples, and,
$\gamma = Q^{-1}$. (Desired False Alarm Rate), where $Q^{-1}$ is the inverse probability function; and
generate a fire notification signal when said energy level signal is greater than said threshold value.

17. The computer readable medium of claim 16, wherein said computer readable program code is further to cause the processing circuitry to:
(a) rotate a mirror of an infrared sensor in a circular path;
(b) pause said mirror on each of a plurality of bearings along said circular path, wherein each of said plurality of bearings spans a predetermined number of degrees;
(c) take a plurality of energy samples for each of said plurality of bearings using said infrared sensor during said pausing;
(d) compute an energy value for each of said plurality of bearings based on said plurality of energy samples;

(e) compare said energy values for each of said plurality of bearings to said threshold value; and
(f) repeat (a) and (e) until said energy value for one of said plurality of bearings exceeds the threshold value a predetermined number of times.

18. The computer readable medium of claim 17, when said energy value for one of said plurality of bearings has exceeded the threshold value the predetermined number of times, the computer readable program code further to cause the processing circuitry to:
take additional energy samples for said one of said plurality of bearings that exceeded the threshold value the predetermined number of times;
normalize said additional energy samples;
compare said normalized additional energy samples to the said threshold value; and
generate said fire notification signal when said normalized additional energy samples exceeds said threshold value.

19. The computer readable medium of claim 17, wherein said threshold value is dynamically adjusted based on said plurality of energy samples.

20. The computer readable medium of claim 16, wherein said frequency range is between 1 and 10 Hertz.

21. The computer readable medium of claim 16, wherein said electromagnetic radiation comprises radiation emission from heated carbon dioxide.

22. The computer readable medium of claim 16, wherein said fire notification signal includes fire location information.

23. The computer readable medium of claim 16, wherein said processing circuitry includes at least one of a microprocessor, a root mean square conditioning circuit and a digital frequency converting circuit.

24. A system comprising:
a sensor for receiving electromagnetic radiation from an energy source;
a first filter coupled to the sensor for filtering said electromagnetic radiation to a wavelength range centered about a predetermined frequency associated with the presence of fire;
a second filter for filtering an energy level signal to a flicker frequency range indicative of fire; and
a processing circuitry coupled to the sensor and including at least one of a microprocessor, a root mean square conditioning circuit and a digital frequency converting circuit, said processing circuitry to compare a magnitude of said energy level signal to a dynamically computed threshold value based on ambient infrared energy levels, and if said energy level signal is greater than said threshold value, said processing circuitry is to generate a fire notification signal.

* * * * *